(12) United States Patent
Kanda et al.

(10) Patent No.: US 12,386,504 B2
(45) Date of Patent: Aug. 12, 2025

(54) DISPLAY DEVICE AND PRESENTATION DEVICE EQUIPPED WITH SAME

(71) Applicant: OMRON CORPORATION, Kyoto (JP)

(72) Inventors: Ryota Kanda, Kyoto (JP); Junya Fujita, Kyoto (JP); Naoya Kakimoto, Kyoto (JP)

(73) Assignee: OMRON CORPORATION, Kyoto (JP)

( * ) Notice: Subject to any disclaimer, the term of this patent is extended or adjusted under 35 U.S.C. 154(b) by 0 days.

(21) Appl. No.: 18/822,538

(22) Filed: Sep. 3, 2024

(65) Prior Publication Data

US 2025/0110638 A1 Apr. 3, 2025

(30) Foreign Application Priority Data

Sep. 28, 2023 (JP) .................. 2023-167793

(51) Int. Cl.
*G06F 3/04886* (2022.01)
*G07F 9/02* (2006.01)
*G09G 3/00* (2006.01)

(52) U.S. Cl.
CPC .......... *G06F 3/04886* (2013.01); *G07F 9/026* (2013.01); *G09G 3/002* (2013.01)

(58) Field of Classification Search
CPC ...... G06F 3/04886; G07F 9/026; G09G 3/002
USPC .................................................. 345/173–174
See application file for complete search history.

(56) References Cited

U.S. PATENT DOCUMENTS

| 9,104,306 B2 * | 8/2015 | Chan ...................... G06F 3/018 |
| 10,984,969 B1 | 4/2021 | Wang et al. | |
| 2005/0237317 A1 | 10/2005 | Cok | |
| 2007/0171503 A1 | 7/2007 | Luo | |
| 2011/0102371 A1 | 5/2011 | Chang et al. | |
| 2011/0122095 A1 | 5/2011 | Tsai et al. | |

(Continued)

FOREIGN PATENT DOCUMENTS

| CN | 102541437 A * | 7/2012 | ............. G06F 3/018 |
| CN | 106471799 A * | 3/2017 | ......... G03B 21/2086 |

(Continued)

OTHER PUBLICATIONS

U.S. Office Action (USOA) issued on Jun. 30, 2025 in a related U.S. Appl. No.18/823,801.

*Primary Examiner* — Kwin Xie

(74) *Attorney, Agent, or Firm* — METROLEX IP LAW GROUP, PLLC; Robert L. Scott, Esq.

(57) ABSTRACT

A display selection button 10 comprises a light projecting unit 21, a light guide plate 13, a light receiving units 22, a control unit 30, and a printed sheet 14 and a LED 25. The light guide plate 13 has an incident surface 13a to which the light emitted from the light projecting unit 21 is incident, a plurality of prisms 13d that reflect incident light toward the side approaching or touching a finger and are provided at positions corresponding to push buttons 10c, and an exit surface 13b that emits the light reflected in the direction in which the finger approaches. The light receiving units 22 receive light emitted from the exit surface 13b and reflected from a finger. The control unit 30 detects the approach of a finger depending on the amount of light received by the light receiving units 22. The printed sheet 14 displays the desired numerals. The LED 25 emits light for displaying the desired numerals in the printed sheet 14.

11 Claims, 14 Drawing Sheets

(56) References Cited

U.S. PATENT DOCUMENTS

| | | | |
|---|---|---|---|
| 2011/0148818 | A1 | 6/2011 | Jhu et al. |
| 2011/0221705 | A1 | 9/2011 | Yi et al. |
| 2012/0044209 | A1 | 2/2012 | Kim |
| 2012/0295058 | A1 | 11/2012 | Brosnihan et al. |
| 2016/0170565 | A1 | 6/2016 | Ilmonen et al. |
| 2017/0185234 | A1 | 6/2017 | Zhang |
| 2017/0372114 | A1 | 12/2017 | Cho et al. |
| 2018/0113566 | A1* | 4/2018 | Shigemori ............ G02F 1/1368 |
| 2018/0228557 | A1* | 8/2018 | Darisse ................ A61B 1/0057 |
| 2020/0272244 | A1 | 8/2020 | Autio et al. |
| 2021/0342030 | A1 | 11/2021 | Shinohara et al. |
| 2025/0110578 | A1 | 4/2025 | Kanda et al. |
| 2025/0111731 | A1 | 4/2025 | Kanda et al. |

FOREIGN PATENT DOCUMENTS

| | | | |
|---|---|---|---|
| JP | 2013-137602 A | 7/2013 | |
| WO | WO-2015155980 A1 * | 10/2015 | ......... G06F 3/04847 |

* cited by examiner

DISPLAY DEVICE AND PRESENTATION DEVICE EQUIPPED WITH SAME

CROSS-REFERENCE TO RELATED APPLICATIONS

This application claims priority to Japanese Patent Application No. 2023-167793 filed on Sep. 28, 2023. The entire disclosure of Japanese Patent Application No. 2023-167793 is hereby incorporated herein by reference.

TECHNICAL FIELD

The present invention relates to a display device that is installed to a presentation device like a vending machine or the like, for example, as well as a presentation device equipped with this display device.

BACKGROUND ART

In recent years, in presentation devices such as vending machines, switch units that allow a user to select a product without touching the device have been employed as switch units that are operated when the user selects and purchases a product.

For example, Patent Literature 1 discloses a switch unit comprising a plurality of information display light sources for displaying various kinds of information required by the user, a sensor for detecting the approach or touch of the user's finger, and a plurality of illumination light sources for illuminating a presentation item, wherein the information display light sources and sensor are provided on the user side, and the illumination light sources are integrated on the other side, that is, the opposite side from the user side.

CITATION LIST

Patent Literature

Patent Literature 1: JP-A 2013-137602 (Japanese Patent No. 5,875,364)

SUMMARY OF THE INVENTION

Technical Problem

However, the following problem is encountered with this conventional switch unit.

The switch unit disclosed in the above publication is equipped concentratedly with an information display unit for displaying various information about the purchased item, a pair of operation display units for displaying the operation of the vending machine main body, and a switch display unit for displaying a switch operation surface for selecting the purchased item. And a proximity sensor is used to detect when a user's finger approaches or touches a push button.

Here, a switch unit is also used in which a light projecting unit that emits light and a light receiving unit that receives the reflected light are used to detect the proximity or contact of a user's finger, instead of a proximity sensor.

With a configuration such as this, in a vending machine, for example, the light projecting unit and the light receiving unit need to be disposed at the positions of push buttons that are pressed by the user's finger.

It is an object of the present invention to provide a display device with a simplified configuration as a switch unit and which functions as a display unit displaying desired numerals, as well as a presentation device equipped with this display device.

Technical Solution

The display device according to the first invention includes a switch unit that detects the approach or touch of a finger with respect to a push button operated by the user's finger and a display unit that displays desired numerals. The switch unit has a first light projecting unit, a first light guide plate, a plurality of light receiving units, and a detection unit. The first light projecting unit emits light. The first light guide plate has an incident surface on which the light emitted from the first light projecting unit is incident, a plurality of first prisms that reflect the light incident from the incident surface toward the side approached or touched by the finger and are provided at positions corresponding to the push buttons, and an exit surface that emits the light reflected by the first prisms in the direction in which the finger approaches or touches. The plurality of light receiving units are provided at positions corresponding to the push buttons and receive the light emitted from the exit surface and reflected by the finger approaching or touching the push button. The detection unit detects the approach or touch of the finger depending on the amount of light received by the light receiving unit. The display unit has a seven-segment display unit and a second light projecting unit. The seven-segment display unit displays desired numerals. The second light projecting unit emits a light for displaying desired numerals in the seven-segment display unit.

Here, for example, when the user's finger approaches or touches a position corresponding to a push button on a display device for displaying numerals of a product price or the like and that is installed to the presentation device such as a vending machine or the like, light emitted from the first light projecting unit and incident on the light guide plate is reflected by the first prisms in the direction in which the finger approaches, and the light reflected by the finger is received by the light receiving unit to detect the operation of that push button.

Here, this display device is provided, for example, to a presentation device such as a vending machine, and is installed at a position corresponding to a push button that is selected and operated when purchasing a product.

The first light projecting unit emits an infrared light, for example.

A plurality of light receiving units are provided for a single first light projecting unit, and receive light that is reflected by the first prisms of the first light guide plate and then reflected off the surface of a finger that approaches or touches the push button in an attempt to operate the push button.

The first prisms are formed inside the light guide plate, and reflect the light incident from the incident surface in a specific direction, and emit the light from the exit surface.

What is detected by this switch unit does not necessarily have to be the user's finger. For example, if the user attempts to operate the switch unit while holding an object, the object the user is holding (a smartphone, a glove or other possession, a stone, a twig, etc.) may be detected instead of a finger.

The second light projecting unit included in the display unit is a LED (Light Emitting Diode), for example, and emits a light to each segment in the seven-segment display unit for displaying numerals of the product price or the like. The light emitted from the second light projecting unit is, for example, a visible light that has a different wavelength from the light emitted from the first light projecting unit.

The seven-segment display unit is a display unit for displaying the numerals of the product price or the like and includes three sets of the seven segments to display three-digit numbers.

This means that the approach to or touch of a push button by a finger can be detected by using a light guide plate including first prisms disposed at positions corresponding to push buttons to emit the light from the first projecting unit at a position corresponding to the push button, and having the light receiving unit detect the reflected light produced when a finger or the like approaches or touches the button.

Consequently, the approach or touch of a finger or the like at a position corresponding to a push button can be easily detected with a simple configuration by having the light emitted from a single first light projecting unit be received at a plurality of light receiving units via a light guide plate.

As a result, it is possible to simplify configuration as a switch unit and function as a display unit displaying desired numerals.

The display device according to the second invention is the display device according to the first invention, wherein the first prisms reflect the light so as to compensate for the decrease in the amount of light depending on the distance from the first light projecting unit.

Here, when a plurality of light receiving units are disposed for the first light projecting unit, the amount of reflection at the first prisms can be adjusted to compensate for the decrease in the amount of light depending on the distance from the first light projecting unit to each light receiving unit, that is, so that an amount of light can be detected that is equal to that of a light receiving unit disposed at a position a short distance to a light receiving unit disposed at a position that is at a long distance.

Consequently, the configuration of a switch unit that detects the approach or touch of a user's finger or the like to a push button by using a light projecting unit and a light receiving unit can be simplified while ensuring the accuracy at which reflected light is detected at a plurality of light receiving units.

The display device according to the third invention is the display device according to the second invention, wherein the first prisms are disposed such that their density per unit of surface area increases as the distance from the first light projecting unit increases.

Consequently, with the first prisms disposed at a position that is twice as far away from the first light projecting unit, the density of first prisms per unit of surface area can be doubled so that roughly twice as much light is reflected as with the first prisms on the side closer to the first light projecting unit.

Therefore, in a configuration in which a plurality of light receiving units are disposed for a single first light projecting unit, even if the amount of light reaching the first prisms changes due to different distances from the first light projecting unit, the amount of light received by each light receiving unit after being reflected by a finger or the like that is near or in contact with a push button can be made approximately the same.

As a result, in a configuration in which a plurality of light receiving units are disposed for a single first light projecting unit, it variance in the detection accuracy of a finger or the like can be suppressed at each light receiving unit.

The display device according to the fourth invention is the display device according to the first or second invention, wherein the first prisms are disposed such that the surface area of the reflecting surface that reflects the light increases as the distance from the first light projecting unit increases.

Consequently, with the first prisms disposed twice as far away from the first light projecting unit, for example, the surface area of the reflective surface can be doubled so that the amount of reflection is roughly twice that with the first prisms closer to the first light projecting unit.

Therefore, in a configuration in which a plurality of light receiving units are disposed for a single first light projecting unit, if the amount of light reaching the first prism should change due to different distances from the first light projecting unit, the amount of light received by each light receiving unit after being reflected by a finger or the like that is close to or in contact with a push button can be made approximately equal.

As a result, in a configuration in which a plurality of light receiving units are disposed for a single first light projecting unit, variance in the accuracy of detecting a finger or the like at each light receiving unit can be suppressed.

The display device according to the fifth invention is the display device according to the first invention, wherein the plurality of the light receiving units have different detection sensitivity so as to compensate for the decrease in the amount of light depending on the distance from the first light projecting unit.

Here, when a plurality of light receiving units are disposed for the first light projecting unit, the detection sensitivity at the light receiving units can be adjusted to compensate for the decrease in the amount of light depending on the distance from the first light projecting unit to each light receiving unit, that is, so that the light receiving unit disposed at a position that is at a long distance detects an amount of light that is equal to that of a light receiving unit disposed at a position a short distance.

Consequently, the configuration of a switch unit that detects the approach or touch of a user's finger or the like to a push button by using a light projecting unit and a light receiving unit can be simplified while ensuring the accuracy at which reflected light is detected at a plurality of light receiving units.

The display device according to the sixth invention is the display device according to the first or second invention, wherein the first and second light projecting units emit lights that have different wavelength range, respectively.

Consequently, for example, the first light projecting unit emits an infrared light and the second light projecting unit emits light a visible light so that the light for finger detection can be reliably detected without mixing of the light for finger detection and the light for display.

The display device according to the seventh invention is the display device according to the first or second invention, wherein the first light guide plate further has an end surface disposed obliquely to the incident surface and the exit surface. The light incident from the first light projecting unit through the incident surface is reflected by the end surface and guided in the planar direction of the first light guide plate, and is reflected by the first prisms and exits from the exit surface.

Consequently, the light incident on the light guide plate is reflected at the end surface disposed at an angle to the incident surface and the exit surface, so the first light projecting unit does not have to be disposed to the side of the light guide plate. This affords greater latitude in the layout of the first light projecting unit and the light receiving units.

The display device according to the eighth invention is the display device of the seventh invention, further includes a single substrate on which the first light projecting unit and the light receiving unit are disposed.

Consequently, since the light guide plate has an oblique end surface that reflects light that has entered the interior toward the first prisms, the first light projecting unit and the light receiving units can be disposed on a shared substrate.

The display device according to the ninth invention is the display device of the first or second invention, further includes a second light guide plate having a plurality of second prisms that reflect the light incident from the first light projecting unit to display a specific design.

The second light guide plate may be a plate-like member common to the first light guide plate.

Consequently, using a second light guide plate including second prisms that displays a pattern or the like in addition to the first light guide plate including first prisms used for detecting a finger, etc., as discussed above allows advertisements such as "price reduction," "bargain item," and "recommended" to be displayed near the presentation object of a presentation device such as a vending machine.

The display device according to the tenth invention is the display device according to the ninth invention, further includes a third projecting unit that causes light to be incident on the second light guide plate and causes the plurality of second prisms to reflect the light.

This allows a pattern or the like to be displayed by the third light projecting unit which irradiates the second light guide plate including the second prisms with light.

The display device according to the eleventh invention is the display device according to the first or second invention, further includes a lens portion that guides the light emitted from the first light projecting unit to the incident surface of the first light guide plate.

Consequently, the light emitted from the first light projecting unit is concentrated by the lens unit to be incident on the incident surface of the first light guide plate, which allows the light emitted from the first light projecting unit to be efficiently guided to the incident surface of the first light guide plate.

The presentation device according to the twelfth invention comprises the display device according to the first or second invention, a presentation unit in which are disposed presentation objects that can be selected and operated with the switch unit, and a plurality of push buttons provided for each of the presentation objects disposed in the presentation unit.

Consequently, a light projecting unit and light receiving units can detect when a user's finger or the like approaches or touches a push button by using the switch unit having a simplified configuration in a presentation device in which a plurality of push buttons are disposed.

Advantageous Effects

With the display device of the present invention, it is possible to function as a display unit for displaying a desired numerals and simplify the configuration as a switch unit.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

A display selection button (display device, switch unit) 10 according to an embodiment of the present invention, and a vending machine (presentation device) 1 equipped with this button will now be described with reference to FIGS. 1 to 11.

In this embodiment, some unnecessarily detailed description may be omitted. For example, detailed description of already known facts or redundant description of components that are substantially the same may be omitted. This is to avoid unnecessary repetition in the following description, and facilitate an understanding on the part of a person skilled in the art.

The applicant has provided the appended drawings and the following description so that a person skilled in the art might fully understand this disclosure, but does not intend for these to limit what is discussed in the patent claims.

(1) Configuration of Vending Machine 1

Figure 1:
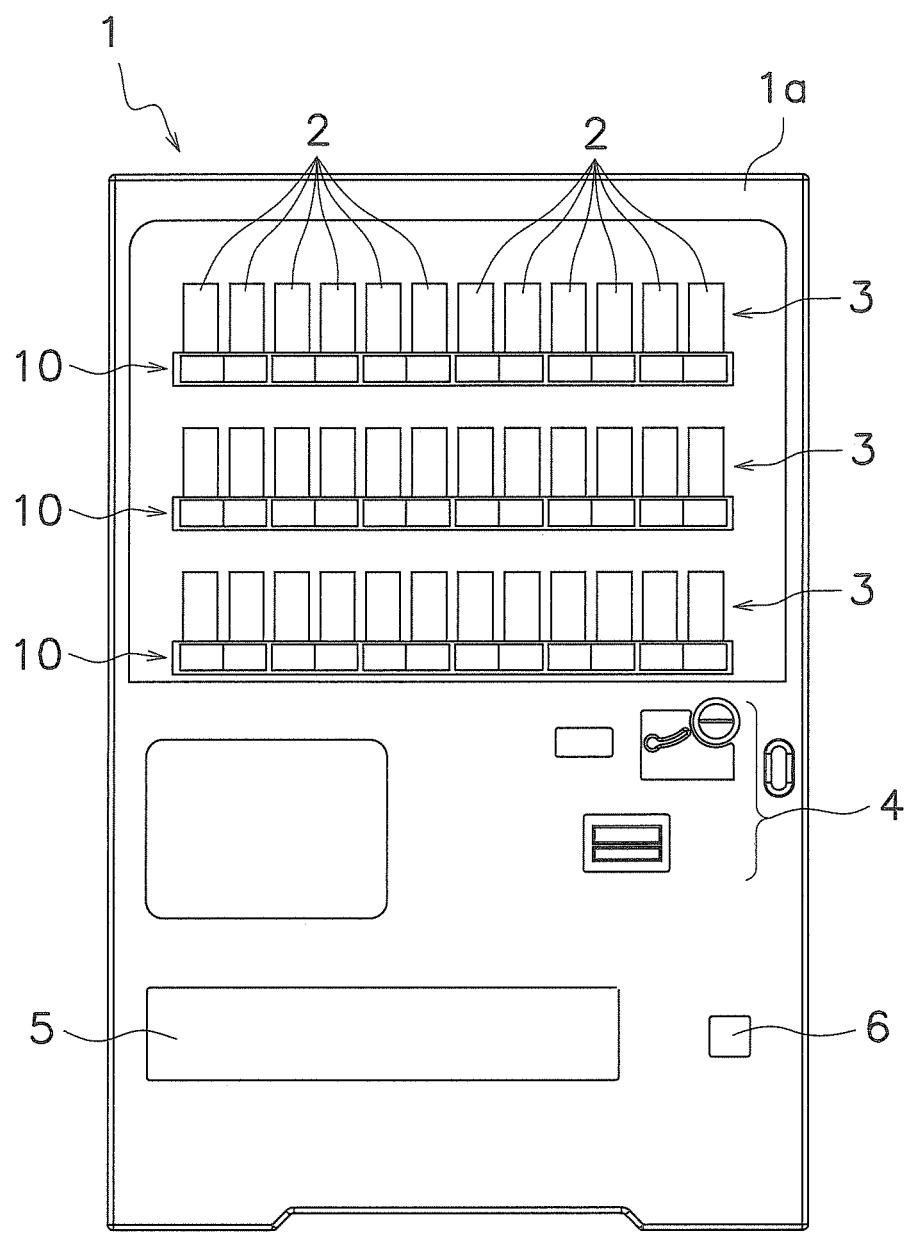
FIG. 1 is an overall view of the configuration of a vending machine in which are installed display selection buttons, according to an embodiment of the present invention.

As shown in FIG. 1, the vending machine (presentation device) 1 of this embodiment comprises a housing part 1a having a roughly cuboid shape, a three-tiered product rack unit (presentation unit) 3 provided on the front of the housing part 1a, a plurality of display selection buttons (display device, switch units) 10, a money insertion slot 4, a product takeout slot 5, and a change return slot 6.

The products (presentation objects) 2 are, for example, samples of drinking water or the like, and as shown in FIG. 1, 12 containers of each are disposed on each shelf of the product rack unit 3. The user can purchase a product 2 by selecting the desired product 2 via a display selection button 10.

As shown in FIG. 1, the product rack unit (presentation unit) 3 is provided in three tiers, and covers the entire upper half of the housing part 1a, and presents products (presentation objects) 2.

As shown in FIG. 1, the display selection button (display device, switch unit) 10 is provided at a position corresponding to each of the products 2 presented in the product rack unit 3, and is operated when a user purchases a selected product 2. It is determined that the display selection button 10 has been operated by detecting that the fingertip of the user purchasing the product 2 has approached or touched the display selection button 10. Furthermore, the display selection button 10 also functions as a display device that displays the price of the product 2, advertisements, etc., in addition to functioning as the switch unit described above.

Here, what is detected by the display selection button 10 does not necessarily have to be the user's finger. For example, if the user attempts to operate the switch unit while holding an object, the object the user is holding (a smartphone, a glove or other possession, a stone, a twig, etc.) may be detected instead of a finger.

The detailed configuration of the display selection button 10 will be described below.

As shown in FIG. 1, the money insertion slot 4 is provided on the right side of the lower front surface of the housing part 1a, and money (bills or coins) for purchasing the product 2 is inserted therein.

As shown in FIG. 1, the product takeout slot 5 is provided at the lower front portion of the housing part 1a, and a product 2 selected with a display selection button 10 is removed from this product takeout slot 5.

As shown in FIG. 1, the change return slot 6 is provided on the right side of the lower front portion of the housing part 1a, and returns change when a product 2 is purchased. That is, if the amount of money inserted into the money insertion slot 4 is more than the cost of the product 2 corresponding to the pressed display selection button 10, the difference between the amount inserted and the cost of the product 2 is returned through the change return slot 6.

Furthermore, the vending machine 1 is equipped, inside the housing part 1a, with a storage section (not shown) for storing products of the same type as the products 2 displayed in the product rack unit 3, a conveyance mechanism (not shown) for conveying products from the storage section to the product takeout slot 5, and a control circuit (not shown) for controlling the entire vending machine 1.

The control circuit is connected to a sensor that recognizes the money inserted through the money insertion slot 4, and if the amount of the inserted money is equal to or greater than the cost of the product 2 corresponding to the display selection button 10 pressed by the user among the display selection buttons 10, the conveyance mechanism is controlled to convey the product 2 from the storage section to the product takeout slot 5.

(2) Configuration of Display Selection Button 10

Figure 2:
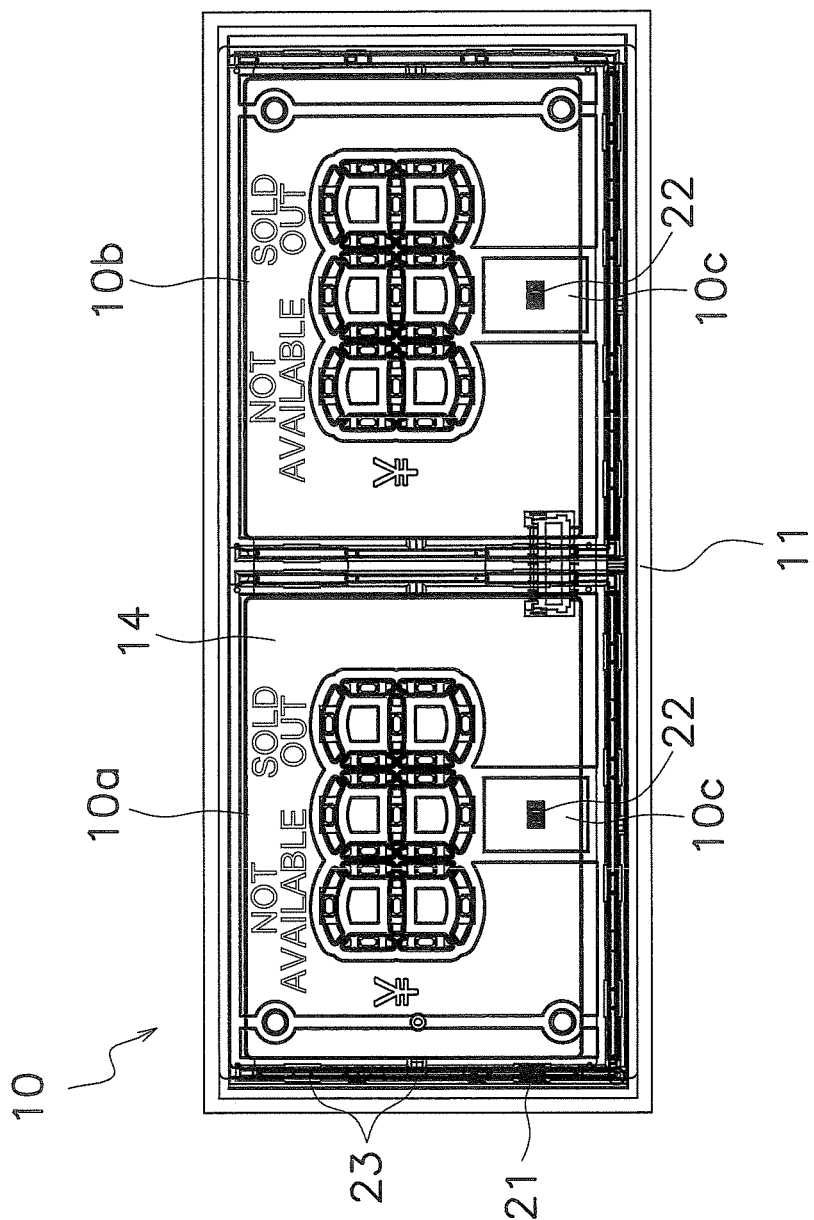
FIG. 2 is a front view of the overall configuration of display selection buttons installed in the vending machine of FIG. 1.

As shown in FIG. 2, the display selection button 10 in this embodiment has first and second display areas 10a and 10b for various kinds of display corresponding to two products, and a push button 10c that is operated when purchasing the product 2 selected by the user.

In the first display area 10a, the display is switched between three-digit numbers, the desired design, etc., and this area is provided in the left half of the display selection button 10 as shown in FIG. 2.

The second display area 10b is similar to the first display area 10a in that the display is switched between three-digit numbers, the desired design, etc., and this area is provided in the right half of the display selection button 10 as shown in FIG. 2.

The numbers and designs displayed in the first display area 10a and the second display area 10b may be the same, or different numbers and designs may be displayed, or the display may be switched sequentially.

Consequently, not only the price of the product 2 presented in the vending machine 1, but also designs and so forth can be displayed, which attracts the attention of the user more effectively.

As shown in FIG. 2, a push button 10c is provided at the bottom part of the first display area 10a and the second display area 10b, and is the portion that is approached or touched by the finger of a user who wishes to purchase a product 2. A light receiving unit 22 (discussed below) is provided on the back side of the push button 10c.

With the display selection button 10 of this embodiment, a change in the amount of light received by the light receiving unit 22 is detected, thereby detecting that the user's finger has approached or touched the position of the push button 10c.

Figure 3:
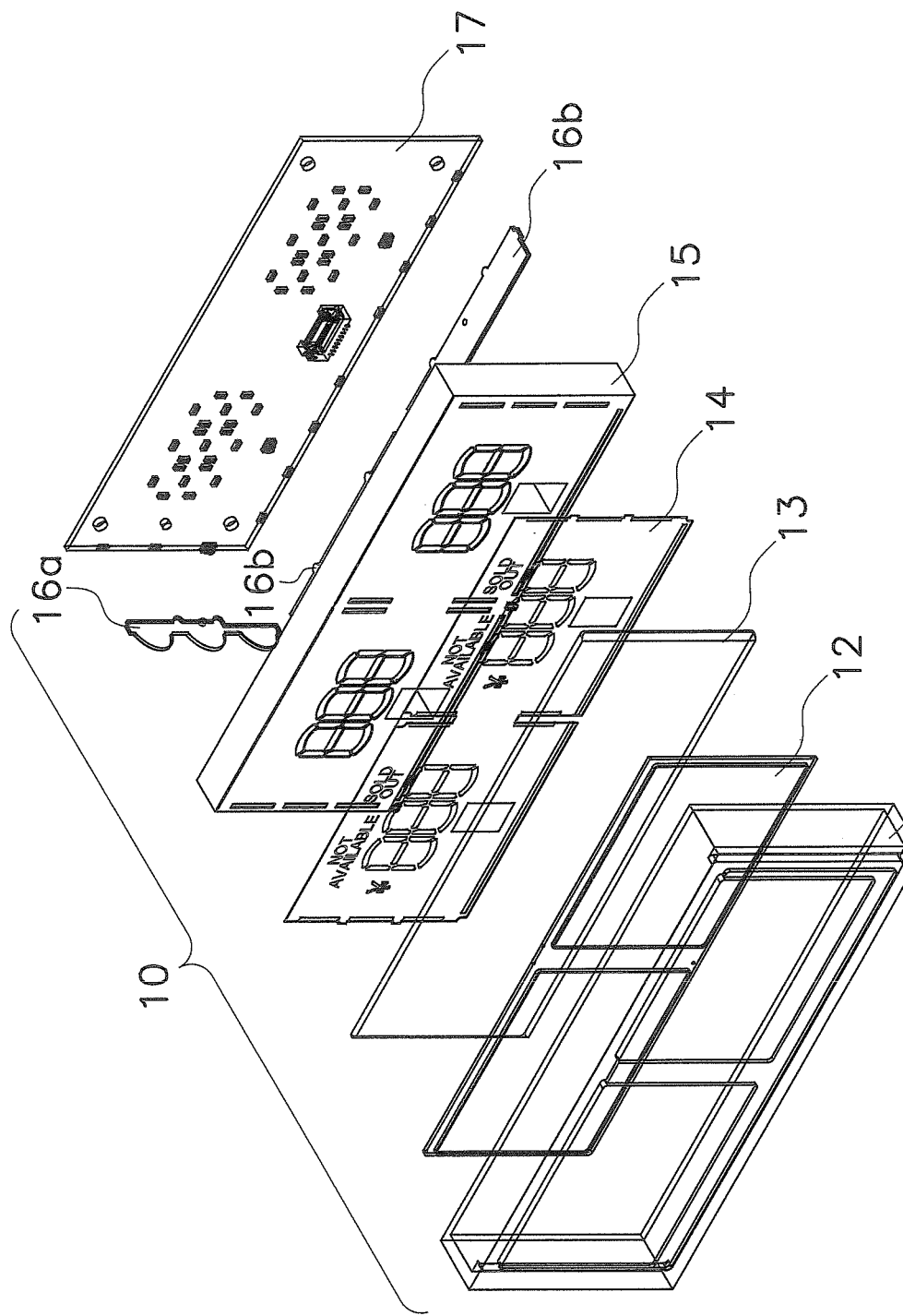
FIG. 3 is an exploded oblique view of the configuration of the display selection buttons in FIG. 2.

As shown in FIG. 3, the display selection button 10 includes a cover 11, a gray smoked plate 12, a light guide plate (first light guide plate, second light guide plate) 13, a printed sheet (seven-segment display unit) 14, a partition case 15, Fresnel lenses 16a and 16b, and a substrate 17.

As shown in FIG. 3, the cover 11 is a box-shaped member that constitutes the front side of the display selection button 10, and its rear side is covered by the substrate 17. The cover 11 has openings at positions corresponding to the first display area 10a and the second display area 10b so that the first display area 10a and the second display area 10b are exposed on the front side.

The gray smoked plate 12 is a translucent plate-like member that is fitted at positions corresponding to the first display area 10a and the second display area 10b, and is provided to make the seven segments less visible from the surface in a non-display state. As shown in FIG. 3, the gray smoked plate 12 is disposed between the cover 11 and the light guide plate 13.

The light guide plate (first light guide plate, second light guide plate) 13 is made of a translucent material such as acrylic resin or glass, and diffuses the light emitted from a light source (such as a light projecting unit 21; discussed below) in the interior and emits the light in the desired direction. As shown in FIG. 3, the light guide plate 13 is disposed between the gray smoked plate 12 and the printed sheet 14.

With the display selection button 10 of this embodiment, the light guide plate 13 emits light from a position corresponding to the push button 10c to detect the approach or touch of a finger, and also emits light to display a design when viewed from the front side.

The detailed configuration of the light guide plate 13 will be discussed below.

A seven-segment portion for displaying numbers, a yen symbol portion, and so forth are formed in advance on the printed sheet (seven-segment display unit) 14, and this sheet displays the desired number by transmitting light emitted from a light source (discussed below). The printed sheet 14 has openings at positions corresponding to the light receiving units 22, and is disposed between the light guide plate 13 and the partition case 15 as shown in FIG. 3.

The partition case 15 is a member that prevents light interference by separating each of the seven segments of the printed sheet 14 with partition plates, and has openings at positions corresponding to the light receiving units 22. The partition case 15 is disposed between the printed sheet 14 and the substrate 17 as shown in FIG. 3.

The Fresnel lenses (lens portions) 16a and 16b are provided along the left side and the bottom side, respectively, of the substantially rectangular substrate 17 in order to irradiate the incident surface 13a (see FIG. 5A, etc.) of the light guide plate 13 with the light emitted from the light source (discussed below).

As shown in FIG. 3, the Fresnel lens 16a has a shape in which three semicircular flat lenses are linked in the radial direction, and irradiates the rear surface (incident surface 13a) of the light guide plate 13 with the light emitted from the light projecting unit 21 and LEDs (light emitting diodes) 23.

As shown in FIG. 3, the Fresnel lens 16b is a substantially rectangular flat lens, and irradiates the rear surface (incident surface 13a) of the light guide plate 13 with the light emitted from LEDs 24.

The substrate 17 is a flat member that constitutes the back side of the display selection button 10, and its upper surface is provided with a plurality of light sources (light projecting unit 21 and LEDs 23, 24, 25).

Figure 4:
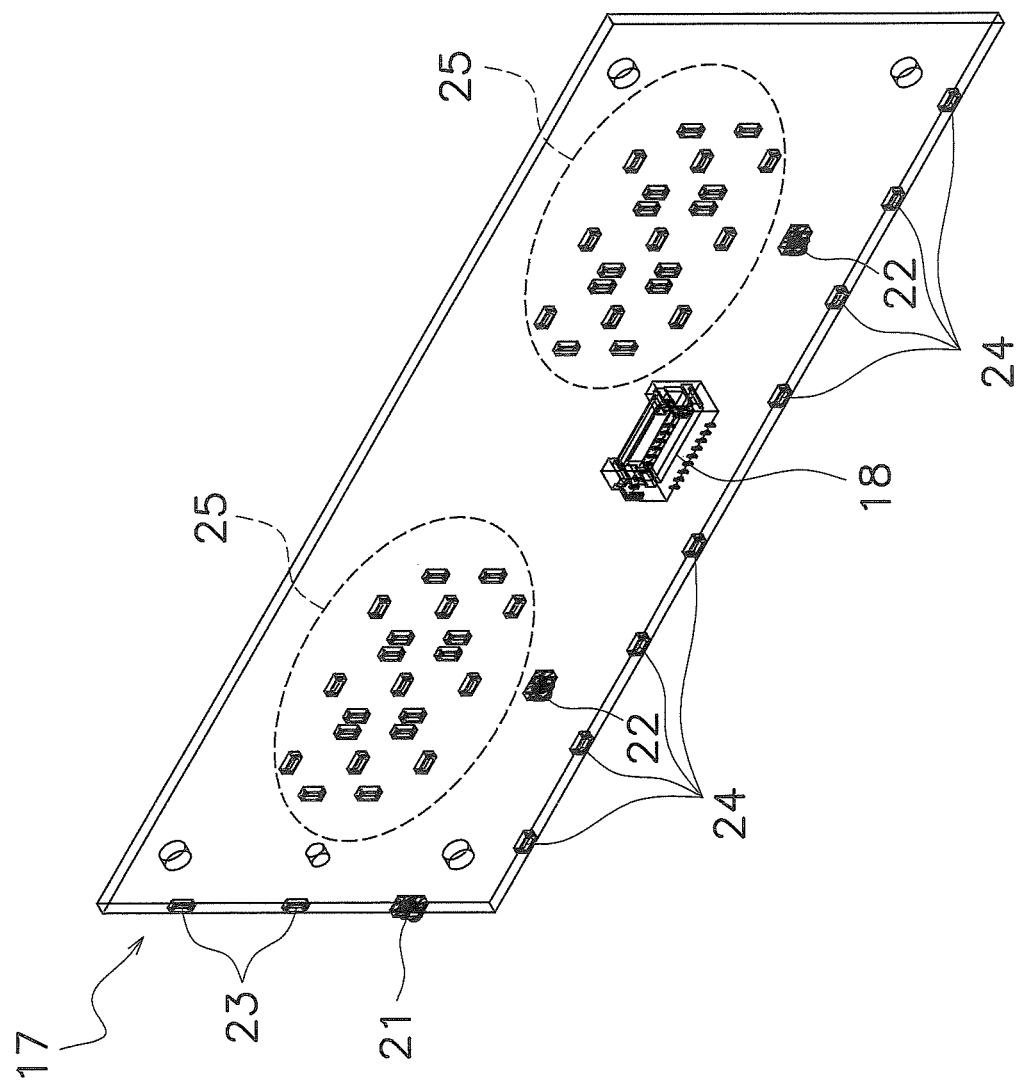
FIG. 4 is an oblique view of various light sources disposed on a substrate included in the display selection buttons of FIG. 3.

More precisely, as shown in FIG. 4, the display selection button 10 has the light projecting unit (first light projecting unit) 21, the light receiving units 22, the LEDs (third light projecting units) 23 and 24, the LEDs (second light projecting units) 25, and a control unit (detection unit) 30 (see FIG. 6) provided on the upper surface of the substrate 17.

As shown in FIG. 4, the light projecting unit (first light projecting unit) 21 is disposed along the lower part of the left side of the substrate 17. The light projecting unit 21 emits infrared light (wavelength range of 625 to 780 nm) onto the incident surface 13a of the light guide plate 13 via the Fresnel lens 16a in order to detect that the finger of a user who wishes to purchase a product 2 has approached or touched the push button 10c.

As shown in FIG. 4, the light receiving units 22 are provided on the upper surface of the substrate 17 at about the same height as the light projecting unit 21. The light receiving units 22 receive infrared light that has been emitted from the light projecting unit 21, diffused inside the light guide plate 13, emitted to the outside from positions corresponding to the push button 10c, and reflected by the surface of the user's finger or the like, thereby detecting that the user's finger has approached or touched the push button 10c.

At this point, the light reflected from the surface of the finger reaches the light receiving units 22 through the translucent gray smoked plate 12, the light guide plate 13, the printed sheet 14, and the openings in the partition case 15.

Also, the light detection wavelength is set so that the light receiving units 22 will detect only the infrared light emitted from the light projecting unit 21, and not the visible light emitted from the other light sources (LEDs 23, 24, and 25).

The LEDs (third light projecting units) 23 and 24 are provided as light sources for displaying the desired design with the light guide plate 13. The LEDs 23 and 24 irradiate the incident surface 13a of the light guide plate 13 with visible light (wavelength range of 450 to 625 nm) via the Fresnel lenses 16a and 16b.

Figures 5A, 5B:
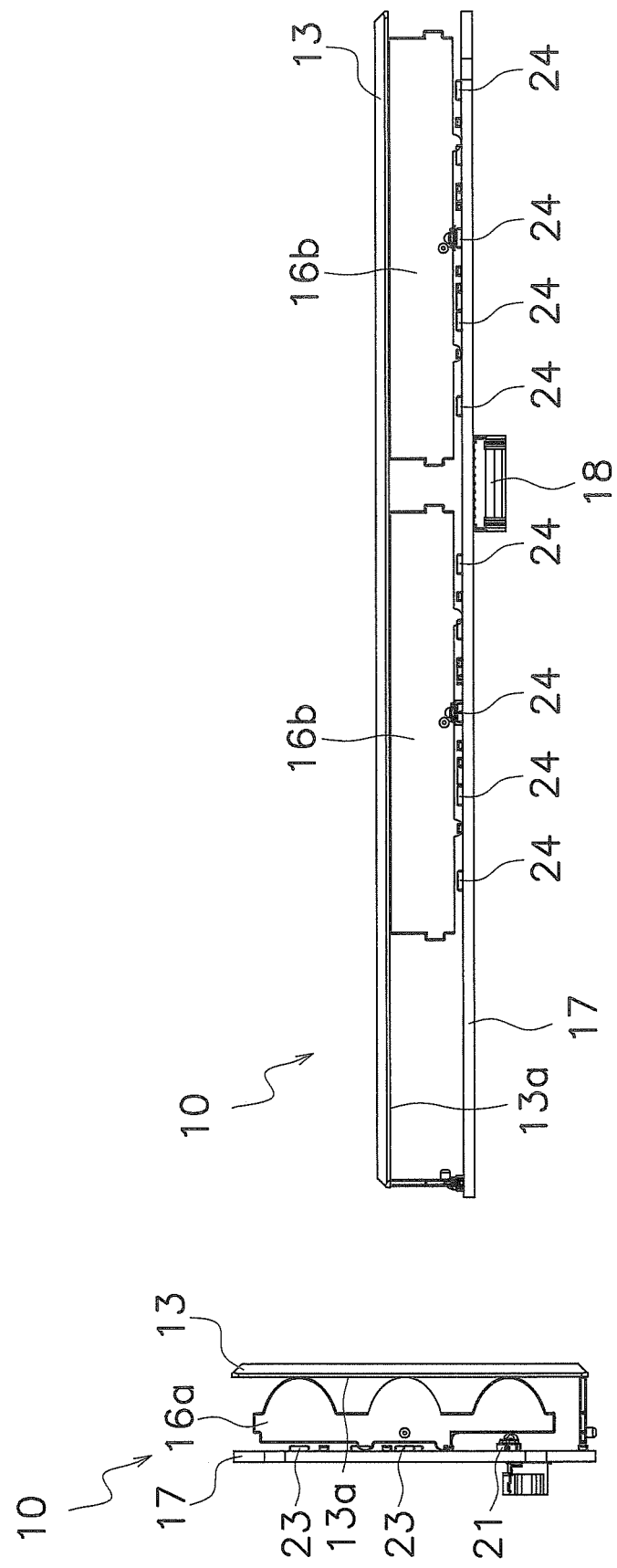
FIG. 5A is a side view of the configuration around the light projecting unit in the display selection button of FIG. 2.
FIG. 5B is a cross-sectional view of the configuration around the LED in the display selection button of FIG. 2.

More precisely, as shown in FIG. 4, two LEDs 23 are provided along the left side of the substrate 17. As shown in FIG. 5A, the LEDs 23 cause light to be incident on the rear surface (incident surface 13a) of the light guide plate 13 via the Fresnel lens 16a.

As shown in FIG. 4, a total of eight LEDs 24 are provided along the lower side of the substrate 17, four for each of the first and second display areas 10a and 10b. As shown in FIG. 5B, the LEDs 24 cause light to be incident on the rear surface (incident surface 13a) of the light guide plate 13 via the Fresnel lens 16b.

The LEDs (second light projecting units) 25 are provided on the upper surface of the substrate 17 at positions corresponding to the seven-segment numerals formed on the printed sheet 14. That is, a total of 21 LEDs 25 (seven segments×three digits) are provided, one for each of the seven segments of the printed sheet 14. The LEDs 25 emit visible light toward the segments corresponding to the numerals to be displayed on the display selection buttons 10.

Figure 6:
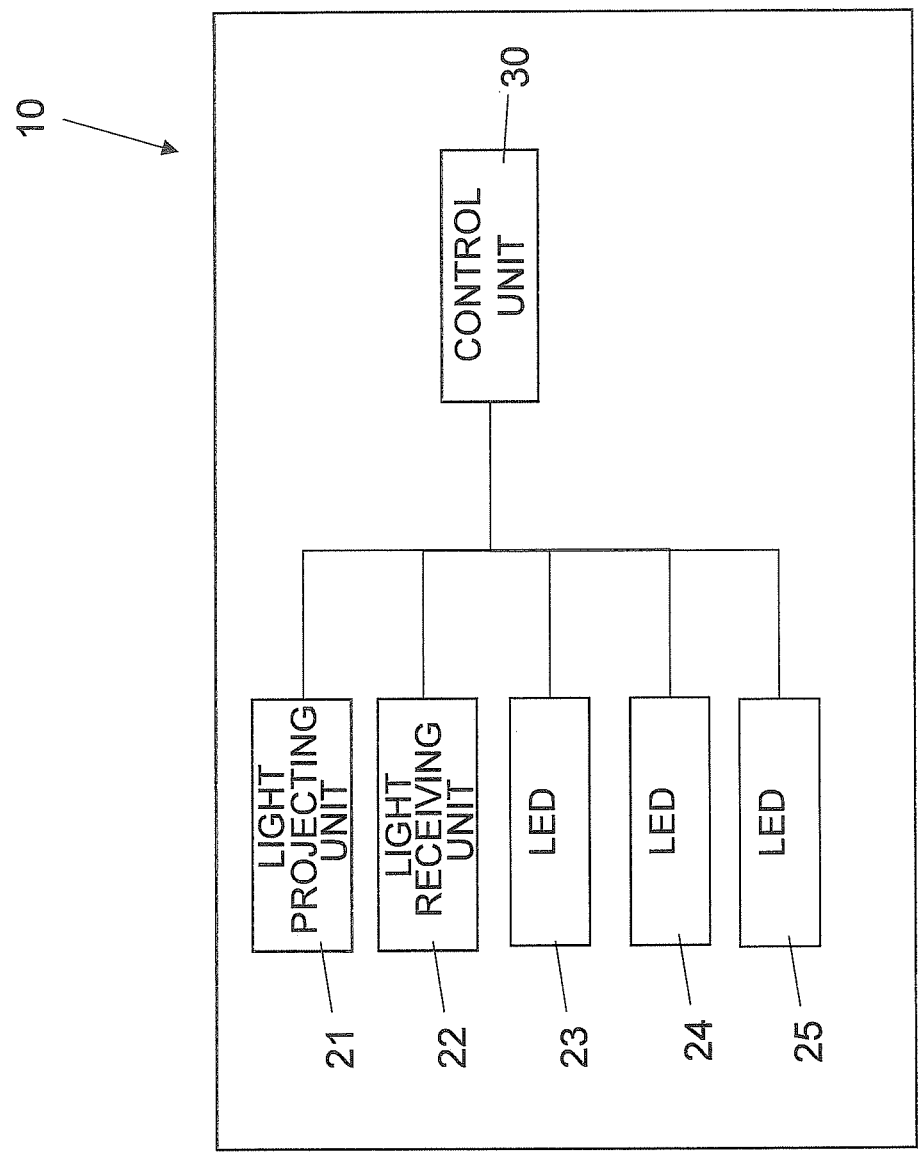
FIG. 6 is a control block diagram of the display selection button in FIG. 2.

The control unit (detection unit) 30 is connected to the substrate 17 via the connector 18 shown in FIG. 5B. As shown in FIG. 6, the control unit 30 is connected to the light projecting unit 21, the light receiving units 22, and the LEDs 23, 24, and 25, and detects the approach or touch of the user's finger to the push button 10c corresponding to the product 2 to be purchased on the basis of the amount of light received by the light receiving units 22.

Also, the control unit 30 can switch the numerals, designs, etc., displayed on the display selection button 10 by controlling the timing at which the light projecting unit 21 and the LEDs 23, 24, and 25 are turned on and off.

With the control unit 30, a threshold value may be set for detecting the approach or touch of a user's finger to the push button 10c, and when the amount of received light exceeds this threshold value, it may be determined that the approach of a finger, etc., has been detected.

(3) Light Guide Plate 13

The light guide plate 13 internally diffuses and reflects the light emitted from the light projecting unit 21 and emits this light in the direction in which the user's finger approaches from the position corresponding to the push button 10c. Also, the light guide plate 13 internally diffuses and reflects the light emitted from the LEDs 23 and 24 to display the desired design or the like on the surface of the push button 10c.

Figure 7:
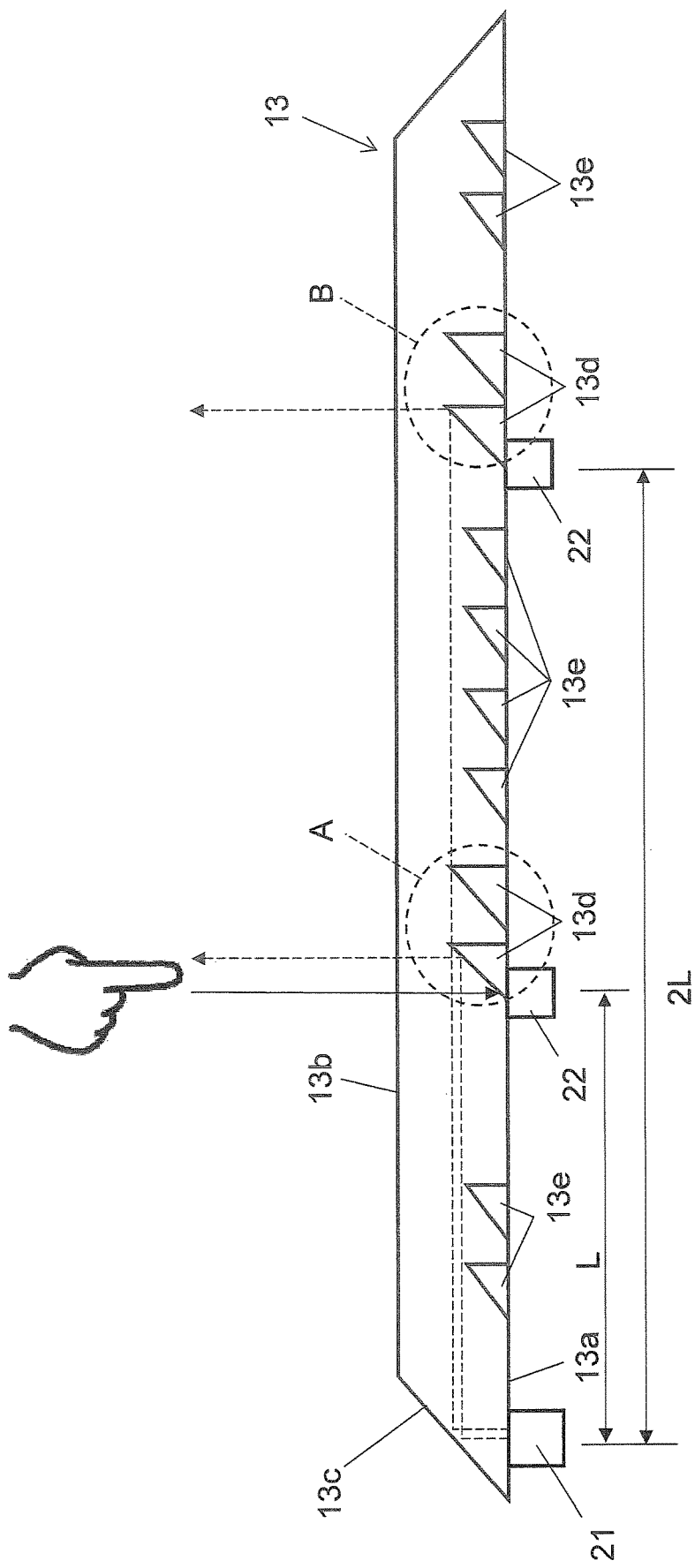
FIG. 7 is a concept diagram illustrating the principle of detecting the approach of a finger by using a light guide plate, a light projecting unit, and light receiving units in the display selection button of FIG. 2.

As shown in FIG. 7, the light guide plate 13 has an incident surface 13a onto which light is incident from the light projecting unit (first light projecting unit) 21, the LEDs (light emitting diodes) (third light projecting units) 23, and the LEDs (third light projecting units) 24 (discussed below), a plurality of prisms (first prisms 13d and second prisms 13e) that reflect the light incident from the incident surface 13a in the desired direction, an exit surface 13b that emits the light reflected by the prisms 13d and 13e to the outside, and an inclined surface 13c that is provided at the end portion.

For the sake of description, the Fresnel lens 16a, etc., disposed between the light projecting unit 21 and the light guide plate 13 are not depicted in FIG. 7. Also, in FIG. 7, the light emitted from the light projecting unit 21 and reflected by the prisms 13d is indicated by a dashed arrow, and the light reflected by a finger and received by the light receiving units 22 is indicated by a solid arrow.

As shown in FIG. 7, the incident surface 13a is on the rear surface side, on the opposite side from the front surface side where the finger approaches, and the light emitted from the light projecting unit 21 is incident on this incident surface 13a.

As shown in FIG. 7, the exit surface 13b is on the front surface side where the finger approaches, and emits light that has been emitted from the light projecting unit 21 and diffused and reflected inside the light guide plate 13.

As shown in FIG. 7, the inclined surface (end surface) 13c is an end surface (side surface) of the light guide plate 13 that links the incident surface 13a and the exit surface 13b, and reflects the light incident from the incident surface 13a toward the surface of the light guide plate 13.

This allows the light projecting unit 21 to be disposed on the rear surface (incident surface 13a) side of the light guide plate 13, so the light projecting unit 21 and the light receiving units 22 can be disposed on the same substrate 17.

As shown in FIG. 7, the prisms (first prisms) 13d are provided at a position (push button 10c) where the finger of a user who wants to purchase a product 2 approaches, and reflect light that has been reflected at the inclined surface 13c in the direction in which the finger approaches. As for the light reflected at the prisms 13d, when the finger approaches (prisms 13d on the left side in the drawing (A portion)), the light reflected at the surface of the finger returns toward the exit surface 13b of the light guide plate 13.

Consequently, when the light receiving units 22 receive this reflected light, it can be easily detected that the user's finger is approaching or touching the light receiving units 22.

That is, when a finger is not approaching (the prisms 13d on the right side in the drawing (B portion)), the light reflected by the prisms 13d is emitted upward without any change. Therefore, in this case, the light receiving units 22 do not detect the light reflected by a finger or the like.

Consequently, when the light receiving units 22 receive reflected light from the surface of a finger or the like, it can be determined that a finger or the like is nearby, and when no reflected light is received, it can be determined that a finger or the like is not nearby.

As a result, the operation of the push button 10c of the display selection button 10 can be detected in a non-contact manner.

The prisms 13d disposed in the A portion (left side) and the B portion (right side) in FIG. 7 will now be described.

With the display selection button 10 of this embodiment, in order to make the amount of light reflected be roughly the same between the prisms 13d disposed in the A portion that is close to the light projecting unit 21, and the prisms 13d disposed in the B portion that is farther away from the light projecting unit 21 than the A portion, light is reflected so as to compensate for the decrease in the amount of light depending on the distance from the light projecting unit 21.

Figure 8B:
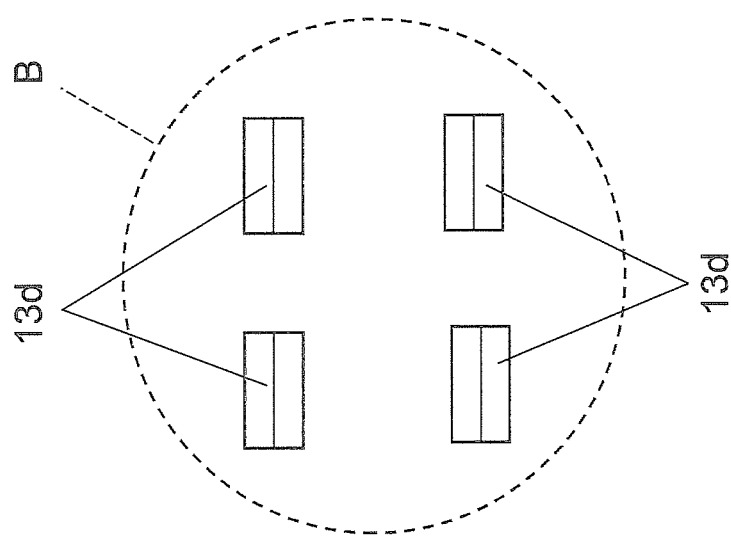
FIG. 8B is a detail plan view of the B portion in FIG. 7.
Figure 8A:
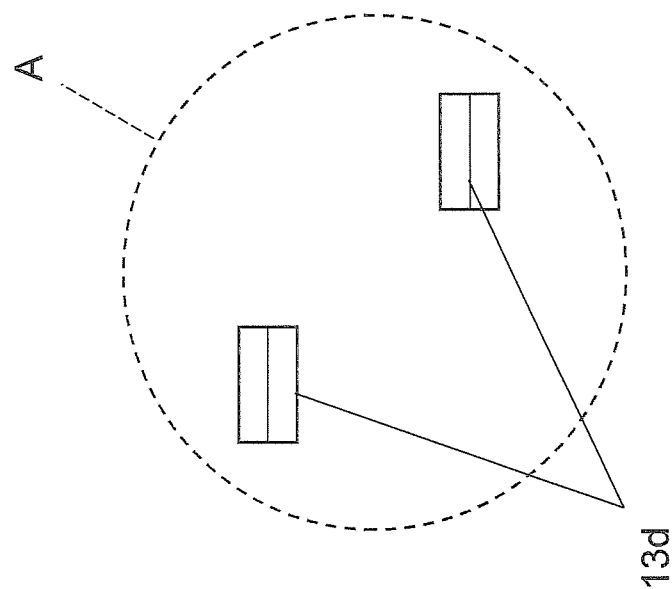
FIG. 8A is a detail plan view of the A portion in FIG. 7.

More specifically, the prisms 13d disposed in the A portion shown in FIG. 8A have a different density from that of the prisms 13d disposed in the B portion shown in FIG. 8B.

That is, compared to the prisms 13d in the A portion that is disposed at a distance L from the light projecting unit 21, the amount of light emitted from light projecting unit 21 is attenuated at the prisms 13d in the B portion that is disposed at a distance of 2L, which is twice the distance from the light projecting unit 21.

Accordingly, when the same prisms 13d are disposed in the A and B portions, which are at different distances from the light projecting unit 21, the amount of light emitted from the B portion that is farther away from the light projecting unit 21 is smaller, and the amount of reflected light emitted from the B portion is also reduced to about half.

In view of this, with the display selection button 10 of this embodiment, in order to compensate for the decrease in the amount of light depending on the distance from the light projecting unit 21, the prisms 13d are disposed so that the density per unit of surface area (such as 1 cm$^2$) increases as the distance from the light projecting unit 21 increases, as shown in FIGS. 8A and 8B.

Consequently, the density per unit of surface area of the prisms 13d in the B portion that is farther from light projecting unit 21 is twice that of the A portion, which means that the amount of light reflected in the B portion can be roughly doubled. Therefore, the amount of reflected light emitted from the B portion also increases, making it possible to detect the approach or contact of a finger with high accuracy, regardless of the distance from light projecting unit 21.

The prisms 13d in the A and B portions all have the same shape. In other words, the only difference between the A and B portions is the disposition density of the prisms 13d, and all of the prisms 13d may be machined in the same shape.

As shown in FIG. 7, the prisms 13e (second prisms) are disposed at positions where the light emitted from light projecting unit 21 is not reflected, and the desired design is displayed by reflecting the light emitted from the above-mentioned LEDs 23 and 24.

Figure 9:
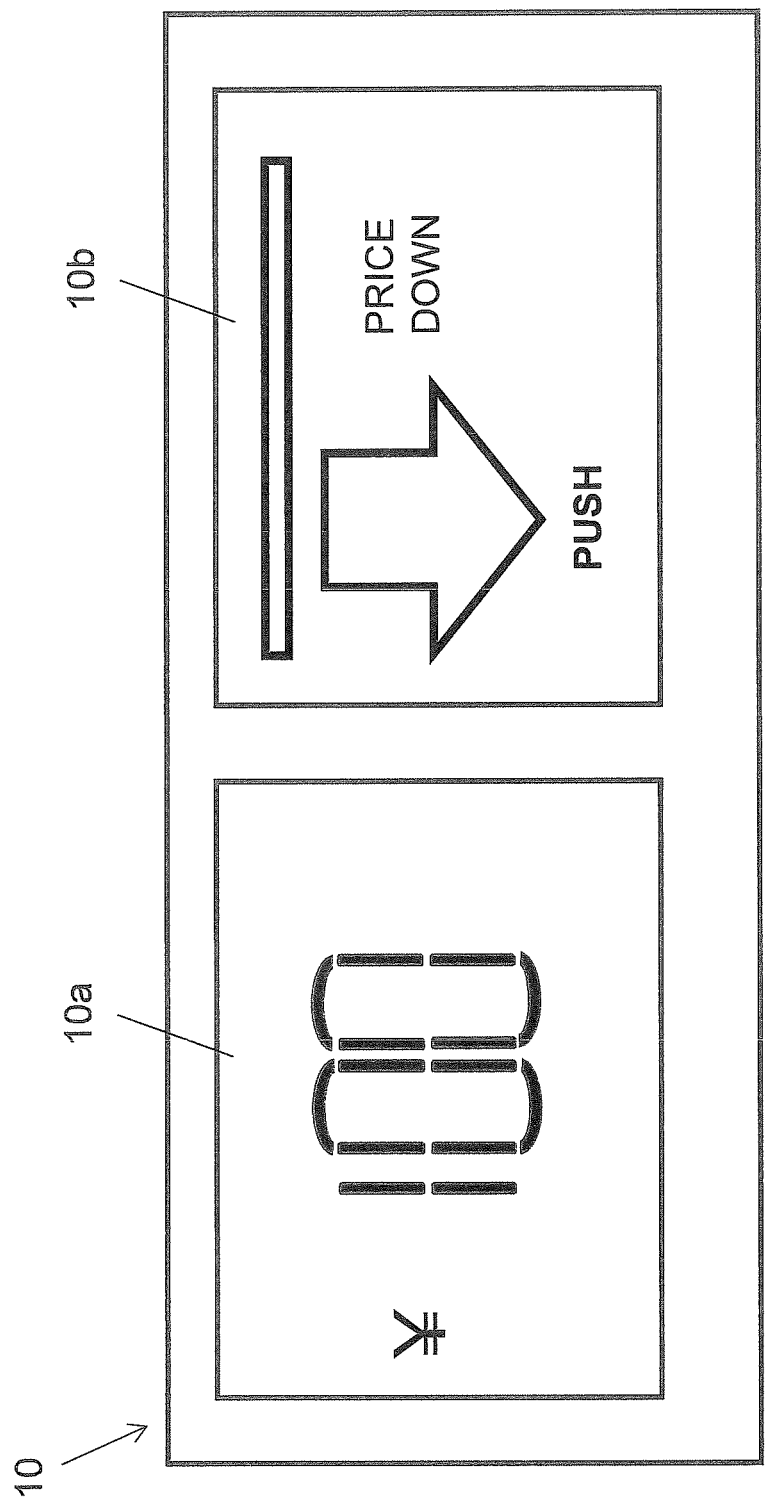
FIG. 9 is a front view of a plurality of display patterns in the display selection button of FIG. 2.

For example, as shown in FIG. 9, the prisms 13e use light emitted from the LEDs 23 and 24 to display a design (a bar-shaped portion, a downward arrow, and words such as PUSH and PRICE DOWN) that are displayed in the second display area 10b on the right side of the drawing.

The "¥100" displayed in the first display area 10a on the left side shown in FIG. 9 is a display indicating the price of a product 2, and can be changed to any price by lighting up the yen symbol included in the printed sheet 14 and the LEDs 25 corresponding to the seven segments.

Also, with the display selection button 10 of this embodiment, the numerals and designs displayed in the first display area 10a and the second display area 10b shown in FIG. 9 can be switched depending on which light source (LEDs 23, 24, 25) is lit by the control unit 30.

Figure 10:
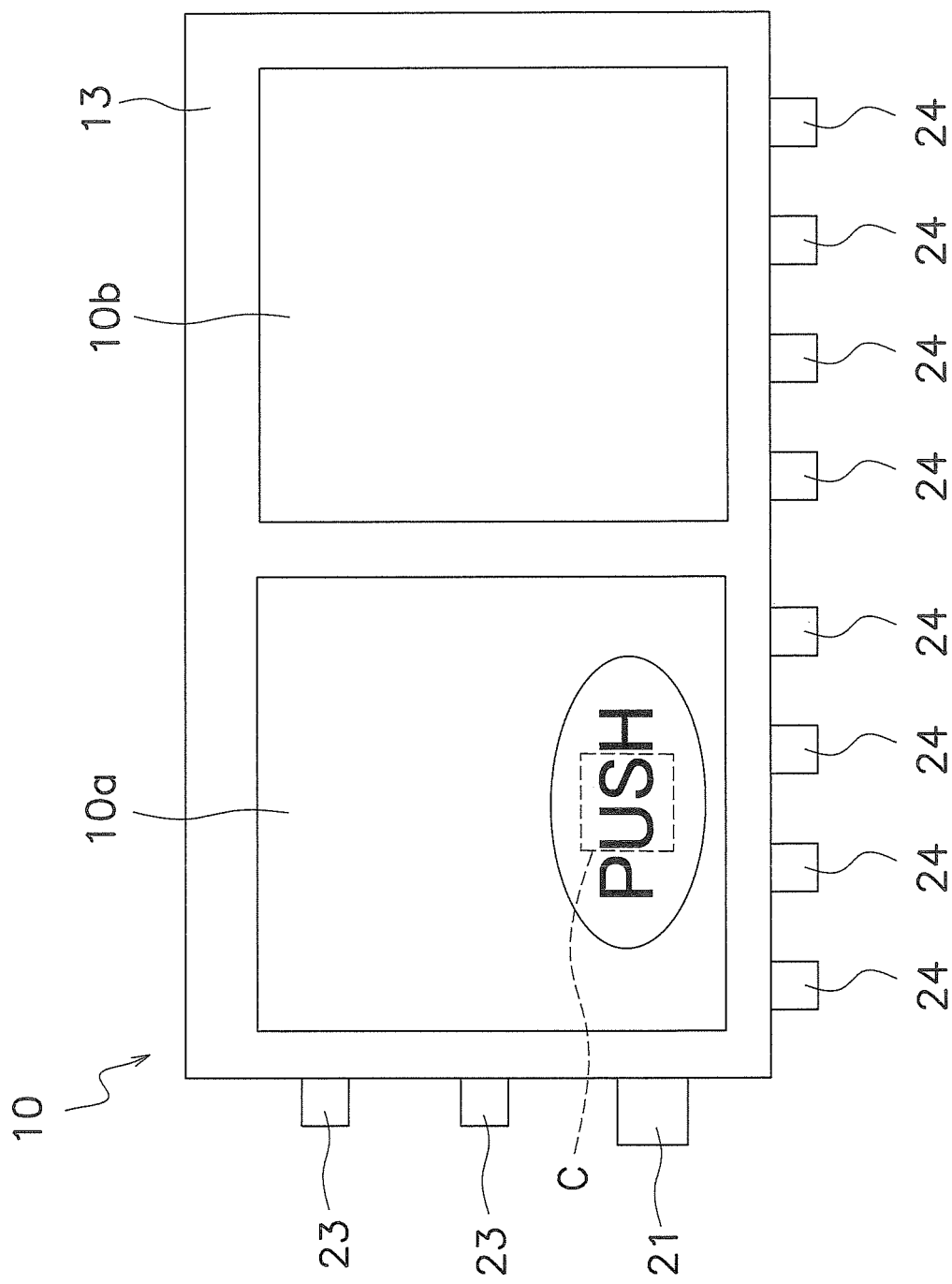
FIG. 10 is a concept diagram illustrating a case in which the word "PUSH" is displayed from among the display patterns in FIG. 10.

For example, a case in which "PUSH" is displayed in the first display area 10a of the display selection button 10 shown in FIG. 10 will now be described with reference to FIGS. 10 and 11.

Figure 11:
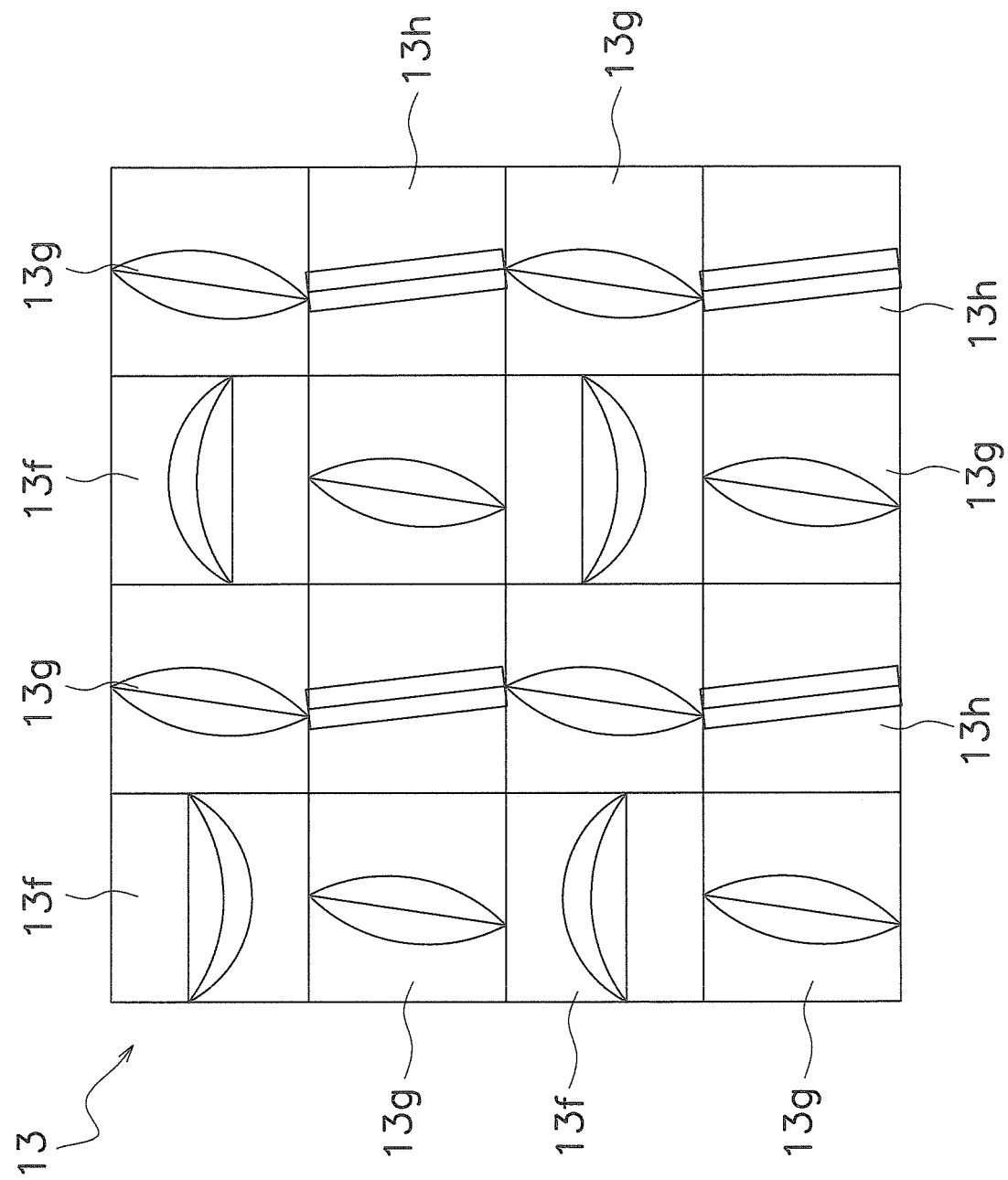
FIG. 11 is a plan view of design display-use worked pattern and finger detection-use worked pattern that have been worked into the light guide plate according to the display pattern of the C portion in FIG. 10.

As shown in FIG. 11, the light guide plate 13 is divided into 16 areas, in which a design display-use worked pattern 13f, a design display-use worked pattern 13g, and a finger detection-use worked pattern 13h are alternately formed.

The design display-use worked pattern 13f is formed with the prisms 13e as shown in FIG. 7. As shown in FIG. 11, the design display-use worked pattern 13f is formed in the first and third boxes from the left in the top row, and the first and third boxes from the left in the second row from the bottom. The design display-use worked pattern 13f reflects visible light emitted from the LED 24 disposed on the lower side shown in FIG. 10, and emits visible light in the direction of the surface of the display selection button 10.

Consequently, the word "PUSH" can be displayed in the lighting color of the LEDs 24 by lighting the LEDs 24.

The design display-use worked pattern 13g is formed with the prisms 13e as shown in FIG. 7. The design display-use worked pattern 13g is formed in the second and fourth boxes from the left in the top row, the first and third boxes from the left in the third row from the bottom, the second and fourth boxes from the left in the second row from the bottom, and the first and third boxes from the left in the bottom row, as shown in FIG. 11. The design display-use worked pattern 13g reflects visible light emitted from the LEDs 23 disposed along the left side shown in FIG. 10, and emits visible light in the direction of the surface of the display selection button 10.

Consequently, an ellipse around "PUSH" can be displayed in the lighting color of the LEDs 23 by lighting the LEDs 23.

The finger detection-use worked pattern 13h is formed with the prisms 13d as shown in FIG. 7. As shown in FIG. 11, the finger detection-use worked pattern 13h is formed in the second and fourth boxes from the left in the third row from the bottom and in the second and fourth boxes from the left in the bottom row. The finger detection-use worked pattern 13h reflects the infrared light emitted from the light projecting unit 21 and guides this infrared light in the direction in which the finger approaches.

This allows the infrared light emitted from the light projecting unit 21 to be emitted in the direction in which the finger is approaching, and whether or not an operation is being performed with a finger can be determined depending on whether or not the reflected light is being received by the light receiving units 22.

Main Features

As shown in FIGS. 5A and 5B, the display selection button 10 of this embodiment detects the approach or touch of a user's finger to a push button 10c operated by the user's finger and display desired numerals. The display selection button 10 includes the light projecting unit 21, the light guide plate 13, the light receiving units 22, and the control unit 30. The light projecting unit 21 emits light. The light guide plate 13 has the incident surface 13a on which the light emitted from the light projecting unit 21 is incident, the plurality of prisms 13d that reflect the light incident from the incident surface 13a to the side where the finger approaches or touches the button and are provided at positions corresponding to the push buttons 10c, and an exit surface 13b that emits the light reflected by the prisms 13d in the direction in which the finger approaches or touches the button. The light receiving units 22 are provided at positions corresponding to the push buttons 10c, and receive the light emitted from the exit surface 13b and reflected by a finger approaching or touching the push button 10c. The control unit 30 detects the approach or touch of a finger depending on the amount of light received by the light receiving units 22. The display selection button 10 includes the printed sheet 14 and the LED 25. The printed sheet 14 displays the desired numerals. The LED 25 emits light for displaying the desired numerals in the printed sheet 14.

Consequently, by using the light guide plate 13 including the prisms 13d disposed at positions corresponding to the push button 10c, the light emitted from the light projecting unit 21 is emitted from the position corresponding to the push button 10c, and the reflected light produced when a finger or the like approaches or touches the push button 10c is detected by the light receiving units 22, which allows the approach or touch of a finger to the push button 10c to be detected.

Therefore, by receiving the light emitted from the single light projecting unit 21 at the plurality of light receiving units 22 via the light guide plate 13, the approach or touch of a finger or the like at a position corresponding to the push button 10c can be easily detected with a simple configuration.

As a result, it is possible to simplify configuration as a switch unit and function as a display unit displaying for desired numerals.

Other Embodiments

An embodiment of the present invention was described above, but the present invention is not limited to or by the above embodiment, and various modifications are possible without departing from the gist of the invention.

(A)

In the above embodiment, an example was given in which the prisms 13d in the B portion shown in FIG. 7 were disposed so that their density per unit of surface area was greater than that of the prisms 13d in the A portion in order to compensate for the decrease in the amount of light depending on the distance from the light projecting unit 21. However, the present invention is not limited to this.

Figure 12:
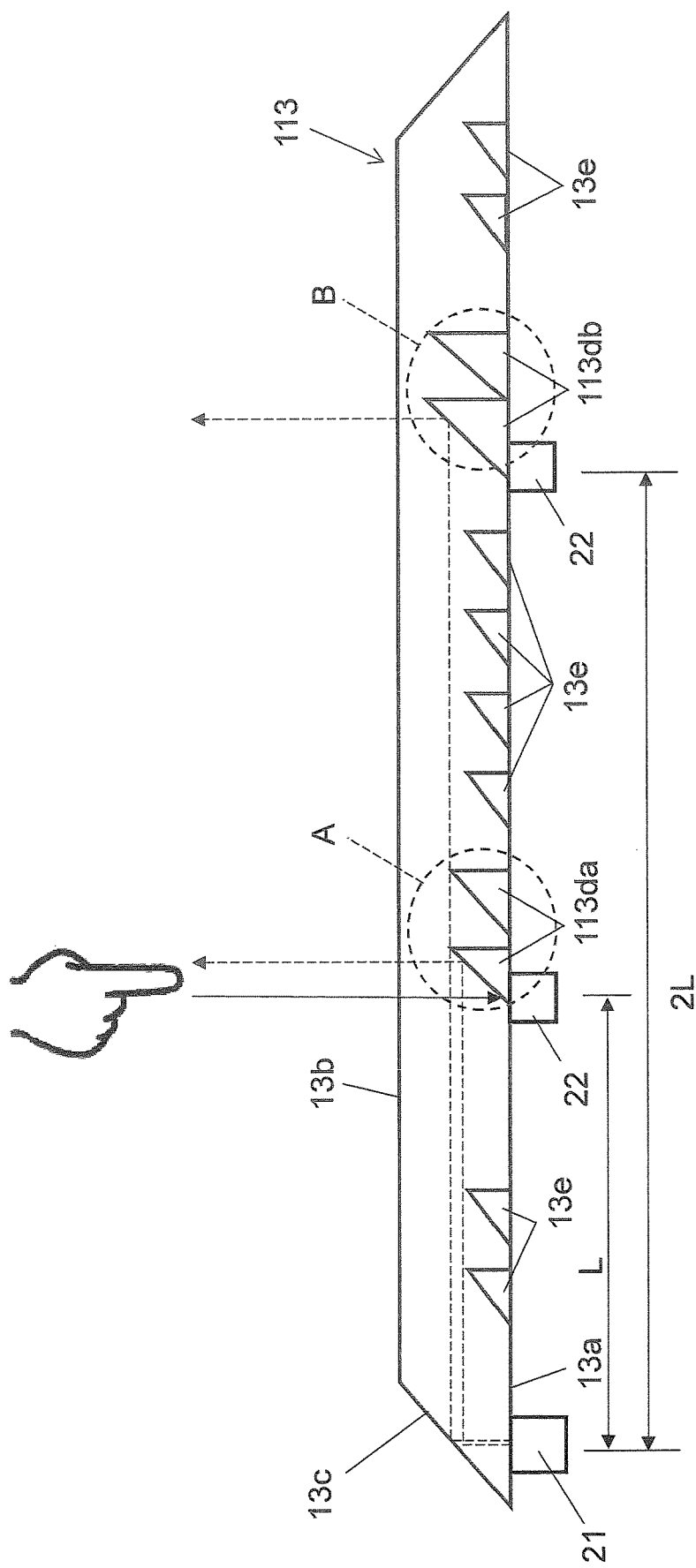
FIG. 12 is a concept diagram illustrating the principle of detecting the approach of a finger using a light guide plate, a light projecting unit, and light receiving units in the display selection button according to another embodiment of the present invention.

For example, as shown in FIG. 12, in order to compensate for the decrease in the amount of light depending on the distance from the light projecting unit 21, a light guide plate 113 may be configured such that the prisms 13d in the B portion are disposed so that the surface area of the reflection surface is roughly double that of the prisms 13d in the A portion.

Figure 13B:
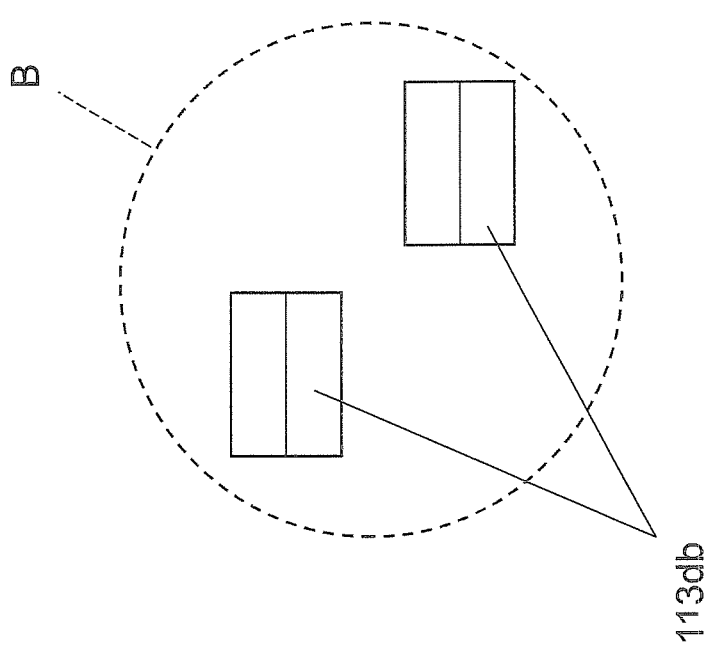
FIG. 13B is a detail plan view of the B portion in FIG. 12.
Figure 13A:
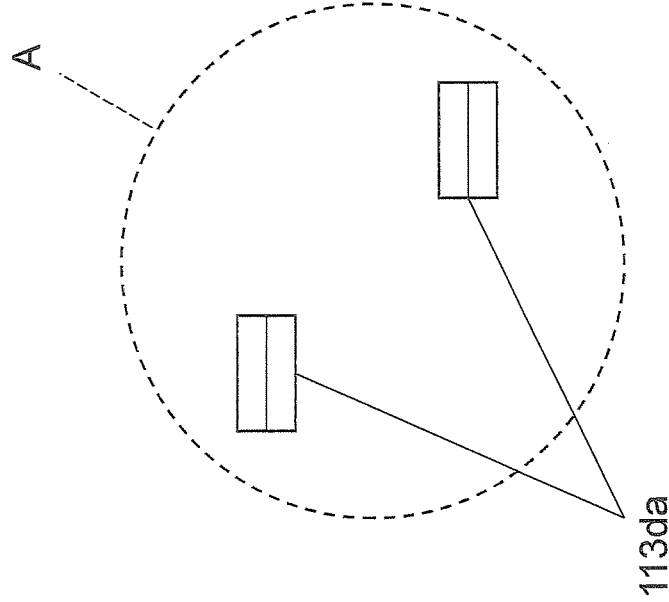
FIG. 13A is a detail plan view of the A portion in FIG. 12.

In this case, as shown in FIGS. 13A and 13B, prisms 113db having a larger reflecting surface area than prisms 113da are disposed so that the surface area of the reflection surface increases as the distance from light projecting unit 21 increases.

Here again, the surface area of the reflection surface of the prisms 113db in the B portion that is farther from light projecting unit 21 is about twice that of the A portion, so the amount of light reflected in the B portion can be increased. Consequently, the amount of reflected light emitted from the B portion also increases, so the approach or touch of a finger can be detected with high accuracy regardless of the distance from light projecting unit 21.

Of the prisms 113da and 113db shown in FIGS. 13A and 13B, the prisms 113da disposed in the A portion may all have the same shape and size, and the prisms 113db disposed in the B portion may all have the same shape and size.

That is, the prisms 113da disposed in the A portion and the prisms 113db disposed in the B portion may have different reflection surface areas, and the prisms 113da and 113db disposed in the same area (A or B) may have the same shape and the same size of the reflection surface.

(B)

In the above embodiment, an example was given in which the light projecting unit 21 was disposed on the upper surface of the substrate 17 shared by the light projecting unit 21 and the light receiving units 22 so that light from the incident surface 13a on the rear side of the light guide plate 13 was made to be incident and was reflected at the inclined surface 13c, thereby diffusing the light in the planar direction of the light guide plate 13. However, the present invention is not limited to this.

Figure 14:
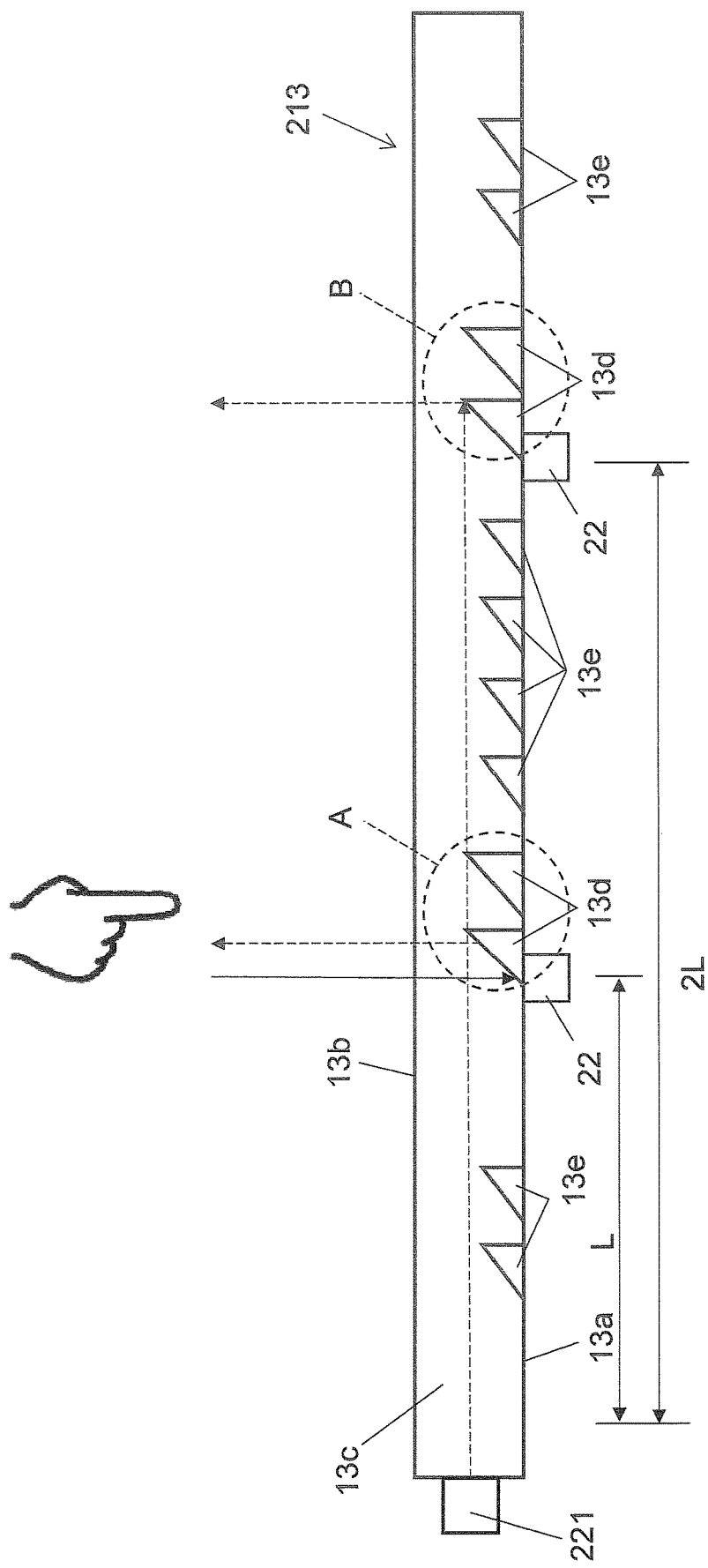
FIG. 14 is a concept diagram illustrating the principle of detecting the approach of a finger using a light guide plate, a light projecting unit, and light receiving units in the display selection button according to yet another embodiment of the present invention.

For example, as shown in FIG. 14, the configuration may be such that light is incident from a light projecting unit 221 disposed on the end surface side of a light guide plate 213, and the light is diffused in the planar direction of the light guide plate 213.

In this case, there is no need to form the end surface of the light guide plate obliquely as in the above embodiment.

(C)

In the above embodiment, an example was given in which a common light guide plate 13 was used as both the first light guide plate for detecting the approach or touch of a finger and the second light guide plate for displaying a design or the like. However, the present invention is not limited to this.

For example, the configuration may be such that a first light guide plate for detecting the approach or touch of a finger and a second light guide plate for displaying a design or the like are used as separate light guide plates.

However, as in the above embodiment, using a single light guide plate 13 to detect the approach or touch of a finger and to display designs or the like allows the display selection button 10 to be made thinner.

(D)

In the above embodiment, an example was given in which the display selection button 10 detected a finger approaching the push button 10c and displayed the desired number, design, or the like. However, the present invention is not limited to this.

For example, the configuration may be such that a configuration that preforms only to detect a finger coming toward a push button and display the desired numerals, and no designs or the like are displayed.

(E)

In the above embodiment, an example was given in which the density per unit of surface area or the surface area of the reflection surface of the prisms 13d that reflected light was changed so as to compensate for the decrease in the amount of light depending on the distance from the light projecting unit 21. However, the present invention is not limited to this.

For example, in order to compensate for the decrease in the amount of light depending on the distance from the light projecting unit, prisms whose reflectance changes depending on the distance from the light projecting unit may be used.

(F)

In the above embodiment, an example was given in which the printed sheet 14 including seven segments was used to display numerals on the display selection button 10. However, the present invention is not limited to this.

For example, instead of a printed sheet, a liquid crystal display panel or a light guide plate may be used as a means for displaying numerals.

(G)

In the above embodiment, an example was given in which the approach or touch of a user's finger was detected by two light receiving units 22 for a single light projecting unit 21 at the display selection button 10 corresponding to two products 2. However, the present invention is not limited to this.

For example, three or more light receiving units may be disposed for a single light projecting unit, and each light receiving unit may detect the approach or touch of the user's finger.

(H)

In the above embodiment, it was described as an example that the infrared light was emitted from the light projecting unit 21 emitting light for detecting the finger and the visible light was emitted from the LEDs 23 and 24 emitting the light for displaying. However, the present invention is not limited to this.

For example, the lights for detecting the finger and for displaying may be not infrared light and visible light if they have different wavelength range.

(I)

In the above embodiment, the vending machine 1 that sold products 2 such as beverages was described as an example of a presentation device in which the switch unit (display selection button 10) of the present invention was installed. However, the present invention is not limited to this.

For example, the switch unit of the present invention may be installed in some other presentation device from which presentation objects are removed by the non-contact operation of a push button.

Addenda

The display device according to the seventh invention is the display device according to any of the first to sixth inventions,
wherein the first light guide plate further has an end surface disposed obliquely to the incident surface and the exit surface, and
light that is incident from the first light projecting unit via the incident surface is reflected at the end surface, guided in the planar direction of the first light guide plate, reflected at the first prisms, and exits from the exit surface.

The display device according to the ninth invention is the display device according to any of the first to eighth inventions,
further comprising a second light guide plate having a plurality of second prisms that reflect the light incident and display a specific design.

The display device according to the eleventh invention is the display device according to any of the first to tenth inventions,
further comprising a lens portion that guides the light emitted from the first light projecting unit to the incident surface of the first light guide plate.

The display device according to the twelfth invention comprises:
the display device according to any of the first to eleventh inventions;
a presentation unit in which presentation objects are disposed and which is selected and operated with the switch unit; and
a plurality of push buttons provided for each of the presentation objects disposed in the presentation unit.

INDUSTRIAL APPLICABILITY

The display device of the present invention exhibits the effect that it is possible to function as a display unit for displaying desired numerals and simplify the configuration as a switch unit, and as such is widely applicable to various kinds of display device having a switching function.

EXPLANATION OF REFERENCE

1 vending machine (presentation device)
1a housing part
2 product (presentation object)
3 product rack unit (presentation unit)
4 money insertion slot
5 product takeout slot
6 change return slot
10 display selection button (display device, switch unit)

10a first display area
10b second display area
10c push button
11 cover
12 gray smoked board
13 light guide plate (first light guide plate, second light guide plate)
13a incident surface
13b exit surface
13c inclined surface (end surface)
13d prism (first prism)
13e prism (second prism)
13f design display-use worked pattern
13g pattern display-use worked pattern
13h finger detection-use worked pattern
14 printed sheet (seven-segment display unit)
15 partition case
16a, 16b Fresnel lens (lens portion)
17 substrate
18 connector
21 light projecting unit (first light projecting unit)
22 light receiving unit
23 LED (third light emitting unit)
24 LED (third light emitting unit)
25 LED (second light-emitting unit)
30 control unit (detection unit)
113 light guide plate (first light guide plate, second light guide plate)
113da prism (first prism)
113db prism (first prism)
213 light guide plate (first light guide plate, second light guide plate)
221 light projecting unit (first light projecting unit)

What is claimed is:

1. A display device comprises a switch unit configured to detect a finger approaching or touching a push button to be operated thereby and a display unit configured to display a desired numeral,
the switch unit including:
a first light projecting unit configured to emit a light;
a first light guide plate having an incident surface on which light emitted from the first light projecting unit is incident, a plurality of first prisms configured to reflect the light incident from the incident surface toward a side approached or touched by the finger and are provided at positions corresponding to the push buttons, and an exit surface configured to emit the light reflected by the first prisms in a direction in which the finger approaches or touches;
a plurality of light receiving units that are provided at positions corresponding to the push buttons and is configured to receive the light emitted from the exit surface and reflected by the finger approaching or touching the push button; and
a detection unit configured to detect the finger approaching or touching of the finger depending on an amount of light received by the light receiving unit,
the display device including:
a seven-segment display unit configured to display the desired numeral, and
a second light projecting unit configured to emit light for displaying the desired numeral in the seven-segment display unit,
wherein the first prisms reflect the light so as to compensate for the amount of light that decreases according to a distance from the first light projecting unit.

2. The display device according to claim 1,
wherein the first prisms are disposed such that their density per unit of surface area increases as the distance from the first light projecting unit increases.

3. The display device according to claim 1,
wherein the first prisms are disposed such that a surface area of the reflecting surface that reflects the light increases as the distance from the first light projecting unit increases.

4. The display device according to claim 1,
further comprising a lens portion configured to guide the light emitted from the first light projecting unit to the incident surface of the first light guide plate.

5. A presentation device, comprising:
the display device according to claim 1;
a presentation unit in which a presentation object selected and operated with the switch unit is disposed; and
a plurality of the push buttons provided for each of the presentation objects disposed in the presentation unit.

6. A display device comprises a switch unit configured to detect a finger approaching or touching a push button to be operated thereby and a display unit configured to display a desired numeral, the switch unit including:
a first light projecting unit configured to emit a light;
a first light guide plate having an incident surface on which light emitted from the first light projecting unit is incident, a plurality of first prisms configured to reflect the light incident from the incident surface toward a side approached or touched by the finger and are provided at positions corresponding to the push buttons, and an exit surface configured to emit the light reflected by the first prisms in a direction in which the finger approaches or touches;
a plurality of light receiving units that are provided at positions corresponding to the push buttons and is configured to receive the light emitted from the exit surface and reflected by the finger approaching or touching the push button; and
a detection unit configured to detect the finger approaching or touching of the finger depending on an amount of light received by the light receiving unit,
the display device including:
a seven-segment display unit configured to display the desired numeral, and
a second light projecting unit configured to emit light for displaying the desired numeral in the seven-segment display unit,
wherein the plurality of light receiving units have different detection sensitivity so as to compensate for an amount of light that decreases depending on a distance from the first light projecting unit.

7. A display device comprises a switch unit configured to detect a finger approaching or touching a push button to be operated thereby and a display unit configured to display a desired numeral, the switch unit including:
a first light projecting unit configured to emit a light;
a first light guide plate having an incident surface on which light emitted from the first light projecting unit is incident, a plurality of first prisms configured to reflect the light incident from the incident surface toward a side approached or touched by the finger and are provided at positions corresponding to the push buttons, and an exit surface configured to emit the light reflected by the first prisms in a direction in which the finger approaches or touches;

a plurality of light receiving units that are provided at positions corresponding to the push buttons and is configured to receive the light emitted from the exit surface and reflected by the finger approaching or touching the push button; and a detection unit configured to detect the finger approaching or touching of the finger depending on an amount of light received by the light receiving unit, the display device including:

a seven-segment display unit configured to display the desired numeral, and a second light projecting unit configured to emit light for displaying the desired numeral in the seven-segment display unit, wherein the first light projecting unit and the second light projecting unit emit a light having a different wavelength range, respectively.

8. A display device comprises a switch unit configured to detect a finger approaching or touching a push button to be operated thereby and a display unit configured to display a desired numeral, the switch unit including:

a first light projecting unit configured to emit a light;

a first light guide plate having an incident surface on which light emitted from the first light projecting unit is incident, a plurality of first prisms configured to reflect the light incident from the incident surface toward a side approached or touched by the finger and are provided at positions corresponding to the push buttons, and an exit surface configured to emit the light reflected by the first prisms in a direction in which the finger approaches or touches;

a plurality of light receiving units that are provided at positions corresponding to the push buttons and is configured to receive the light emitted from the exit surface and reflected by the finger approaching or touching the push button; and a detection unit configured to detect the finger approaching or touching of the finger depending on an amount of light received by the light receiving unit, the display device including:

a seven-segment display unit configured to display the desired numeral, and a second light projecting unit configured to emit light for displaying the desired numeral in the seven-segment display unit, wherein the first light guide plate further has an end surface disposed obliquely to the incident surface and the exit surface, and the light incident from the first light projecting unit through the incident surface is reflected by the end surface and guided in a planar direction of the first light guide plate, and is reflected by the first prisms and exits from the exit surface.

9. The display device according to claim 8, further comprising a single substrate on which the first light projecting unit and the light receiving unit are disposed.

10. A display device comprises a switch unit configured to detect a finger approaching or touching a push button to be operated thereby and a display unit configured to display a desired numeral, the switch unit including:

a first light projecting unit configured to emit a light;

a first light guide plate having an incident surface on which light emitted from the first light projecting unit is incident, a plurality of first prisms configured to reflect the light incident from the incident surface toward a side approached or touched by the finger and are provided at positions corresponding to the push buttons, and an exit surface configured to emit the light reflected by the first prisms in a direction in which the finger approaches or touches;

a plurality of light receiving units that are provided at positions corresponding to the push buttons and is configured to receive the light emitted from the exit surface and reflected by the finger approaching or touching the push button; and a detection unit configured to detect the finger approaching or touching of the finger depending on an amount of light received by the light receiving unit, the display device including:

a seven-segment display unit configured to display the desired numeral, and a second light projecting unit configured to emit light for displaying the desired numeral in the seven-segment display unit, further comprising a second light guide plate having a plurality of second prisms configured to reflect the light incident from the first light projecting unit to display a specific design.

11. The display device according to claim 10, further comprising a third light projecting unit configured to cause light to be incident on the second light guide plate and causes the plurality of second prisms to reflect the light.

* * * * *